US007171866B2

(12) United States Patent
Fervers et al.

(10) Patent No.: US 7,171,866 B2
(45) Date of Patent: Feb. 6, 2007

(54) CONTROLLABLE VIBRATION GENERATOR

(75) Inventors: Wolfgang Fervers, Munich (DE); Martin Schreck, Munich (DE); Franz Riedl, Munich (DE)

(73) Assignee: Wacker Construction Equipment AG, Munich (DE)

( * ) Notice: Subject to any disclaimer, the term of this patent is extended or adjusted under 35 U.S.C. 154(b) by 263 days.

(21) Appl. No.: 10/343,843

(22) PCT Filed: Aug. 3, 2001

(86) PCT No.: PCT/EP01/09014

§ 371 (c)(1),
(2), (4) Date: Aug. 21, 2003

(87) PCT Pub. No.: WO02/11906

PCT Pub. Date: Feb. 14, 2002

(65) Prior Publication Data

US 2004/0025608 A1 Feb. 12, 2004

(30) Foreign Application Priority Data

Aug. 4, 2000 (DE) ................................ 100 38 206

(51) Int. Cl.
*F16H 33/10* (2006.01)
*F16H 37/00* (2006.01)
*F16H 33/00* (2006.01)

(52) U.S. Cl. ................................................ 74/87; 74/61

(58) Field of Classification Search ................ 74/22 R, 74/61, 87, 591; 404/133.05, 133.1, 113; 173/49

See application file for complete search history.

(56) References Cited

U.S. PATENT DOCUMENTS

| | | | | | |
|---|---|---|---|---|---|
| 2,248,182 | A | * | 7/1941 | Mateer | 74/61 |
| 3,192,839 | A | * | 7/1965 | Vivier | 404/117 |
| 3,625,074 | A | * | 12/1971 | Waschulewski | 74/61 |
| 3,814,533 | A | * | 6/1974 | Buck | 404/133.1 |
| 3,875,811 | A | | 4/1975 | Fuller | |
| 4,211,121 | A | * | 7/1980 | Brown | 74/87 |
| 4,356,736 | A | * | 11/1982 | Riedl | 74/61 |
| 4,389,137 | A | * | 6/1983 | Riedl | 404/113 |
| 4,481,835 | A | * | 11/1984 | Storm | 74/61 |
| 4,561,319 | A | * | 12/1985 | Lilja | 74/61 |
| 4,771,645 | A | * | 9/1988 | Persson | 74/61 |
| 5,818,135 | A | | 10/1998 | Riedl et al. | |
| 6,227,760 | B1 | * | 5/2001 | Togami et al. | 404/84.1 |

FOREIGN PATENT DOCUMENTS

| | | |
|---|---|---|
| DE | 37 08 922 A1 | 9/1988 |
| DE | 199 20 348 A1 | 1/2000 |
| EP | 0 092 014 | 10/1983 |
| EP | 0 358 744 | 3/1990 |

* cited by examiner

*Primary Examiner*—Richard Ridley
*Assistant Examiner*—James Pilkington
(74) *Attorney, Agent, or Firm*—Boyle Fredrickson Newholm Stein & Gratz S.C.

(57) ABSTRACT

A vibration generator comprises two unbalance shafts, which are positively coupled in a contra-rotative manner and whose relative phrase position can be shifted by a phase shifting device. Each of the unbalance shafts supports a main unbalance mass and a partial unbalance mass that can move in relation thereto. The position of the partial unbalance masses on the respective unbalance shafts can be actively altered within a large range by adjusting devices. The resulting vibration vector generated by the vibration generator can set in a diverse manner with regard to direction and magnitude.

1 Claim, 3 Drawing Sheets

CONTROLLABLE VIBRATION GENERATOR

BACKGROUND OF THE INVENTION

1. Field of the Invention

The invention relates to a vibration generator in accordance with the preamble of claim 1.

2. Description of the Related Art

Such vibration generators are used advantageously for example in ground-compacting machines, such as for example vibration plates, and are known from EP 0 358 744 B1.

In the case of the known vibration generators two unbalanced shafts are coupled together in such a manner as to be able to rotate in opposite directions, wherein their relative phase position can be adjusted by means of a phase changing device. Each of the unbalanced shafts supports an unbalanced part which is rigidly attached to the respective unbalanced shaft, and an unbalanced part which can freely rotate on the respective unbalanced shaft over a predetermined angle range between end positions which are limited by stops. The stops are disposed with respect to the rigid unbalanced part in such a manner that the resulting total unbalance of the rigid unbalanced part and the movable unbalanced part is a maximum value in the one end position of the movable unbalanced part and is a minimum value in the other end position. The change of position of the rotatable unbalanced parts between the two end positions is effected by virtue of the fact that the direction of rotation of the unbalanced shafts is reversed, i.e. that the rotatable unbalanced parts always assume the same end position in dependence upon the direction of rotation of the unbalanced shaft which supports them.

The relative adjustment between the fixed unbalanced parts and the movable unbalanced parts changes in each case the effective resulting centrifugal force and thus the so-called mr-value (product of the resulting unbalanced mass m and the radius r of the centre of gravity of the resulting unbalanced mass). When the rigid and the movable unbalanced part are disposed on the same side of the unbalanced shaft, their centrifugal forces are summated to create a high mr-value. If, on the other hand, the movable unbalanced part is in its other end position with respect to the unbalanced shaft opposite the rigid unbalanced part, the mr-value is reduced to a minimum.

Such a vibration generator has proven itself extraordinarily well in practice. However, a disadvantage has been established, in that in order to adjust the movable unbalanced parts into the respective opposite end position it is necessary to reverse the direction of rotation of the unbalanced shafts which represents a significant technical expenditure for the drive of the unbalanced shafts. Furthermore, it is above all desirable when using the vibration generator in ground-compacting machines to be able to adjust the vibration generated by the vibration generator in an optimum manner to suit the different grounds and ground-compacting conditions even during the compacting process. Such a fine adjustment of the vibration behaviour is not possible in the case of the known vibration generators and definitely not during the operation.

A generic type-forming vibration generator is known from DE-A-12 14 616, in which are provided a first adjusting device for adjusting the phase position between a main and a part unbalanced mass on a first unbalanced shaft and a second adjusting device for adjusting the phase position between a main and a part unbalanced mass on a second unbalanced shaft, wherein the phase position can be adjusted between the first and the second unbalanced shaft by means of a phase changing device. The first and the second adjusting device are coupled to each other by way of planetary gears, so that the adjustment of the phase position between the main and part unbalanced mass on one unbalanced shaft causes a corresponding adjustment in the opposite direction of the phase position of the unbalanced masses on the other unbalanced shaft.

The object of the invention is to provide a vibration generator, whose vibration parameters, in particular the vibration amplitude and direction, can be adjusted freely and in a number of ways over wide ranges.

The object is achieved by virtue of a vibration generator in accordance with the invention according to claim 1. Advantageous further developments of the invention are evident in the dependent claims.

OBJECTS AND SUMMARY OF THE INVENTION

In the case of the vibration generator in accordance with the invention there are disposed on the two unbalanced shafts in each case a main unbalanced mass and a part unbalanced mass which moves relatively with respect to the main unbalanced mass, wherein a first adjusting device is provided for the purpose of actively adjusting the phase position between the main unbalanced In the case of the vibration generator in accordance with the invention there are disposed on the two unbalanced shafts in each case a main unbalanced mass and a part unbalanced mass which moves relatively with respect to the main unbalanced mass, wherein a first adjusting device is provided for the purpose of actively adjusting the phase position between the main unbalanced mass and the part unbalanced mass of the first unbalanced shaft and a second adjusting device is provided for actively adjusting the phase position between the main unbalanced mass and the part unbalanced mass of the second unbalanced shaft, and the adjusting devices and the phase changing device which determines the phase position of the two unbalanced shafts are supplied with energy from an external source and in each case comprise a separate control. The adjusting devices render it possible for almost any desired phase positions to be set between the main unbalanced mass and the part unbalanced mass. Since the adjusting devices are actively effective, it is not necessary to reverse the direction of rotation of the unbalanced shafts—as is the case for example in the prior art. Furthermore, the change in the phase position is not only limited to two end positions determined by stops. If the adjusting devices are controlled independently of each other, it is also possible to set a different phase position between the main unbalanced mass and the part unbalanced mass on the first unbalanced shaft than on the second unbalanced shaft. Also, as a consequence, it is possible in numerous ways to set predetermined vibration patterns which can be used advantageously for example for the purpose of ground compacting. Since, as a result, the adjusting devices and the phase changing device can be actuated individually, it is possible to set an almost infinite number of vibration patterns, i.e. in particular amplitudes and resulting vibration directions.

In the case of a different advantageous embodiment of the invention the first adjusting device and the phase changing device are in fact supplied with energy from an external source and can be controlled individually in each case. However, the second adjusting device does not comprise its own external energy supply and is controlled by way of the effect of the phase changing device alone or the first adjusting device and the phase changing device. In an advantageous manner the control is performed by means of a form-locking coupling arrangement, so that an adjusting effect by means of the first adjusting device or by means of the phase changing device also directly causes an adjusting effect of the second adjusting device. In contrast to the above described advantageous embodiment this means that the adjustment range is no longer as wide as the second adjusting device cannot be controlled individually. On the other hand, however, by coupling it to the first adjusting device and/or the phase changing device the advantage is created that it is extremely convenient to synchronise the movements, in particular to synchronise the adjustment of the part unbalanced masses to the associated unbalanced shafts and no special control procedure is required by the operator to synchronise the adjustments. Thus, it is not necessary, as is possibly the case in the above described embodiment, to synchronise the control for the adjusting devices for the purpose of setting the part unbalanced masses in phase on the associated unbalanced shaft.

In the case of a particularly advantageous embodiment of the invention the part unbalanced masses can rotate relatively with respect to the main unbalanced masses whilst controlling the corresponding adjusting device and engage over the main unbalanced masses in the form of half shells.

It is particularly advantageous if the adjusting devices and the phase changing device in each case render it possible to change continuously as desired the respective phase positions and subsequently to fix said phase positions. The fixing of the phase position ensures that a vibration behaviour of the vibration generator which has been set once by the operator and a resulting relative position of the unbalanced shafts and the unbalanced masses carried by said shafts is also maintained constant over a longer period of time.

If the phase positions can be changed in a range of up to 360° any desired vibration direction and amplitude can be set within the scope of the limit values determined by the mechanical structure.

BRIEF DESCRIPTION OF THE DRAWINGS

These and other advantages and features of the invention are further explained hereinunder with the aid of the accompanying drawings, in which.

DETAILED DESCRIPTION OF THE PREFERRED EMBODIMENTS

Figure 1:
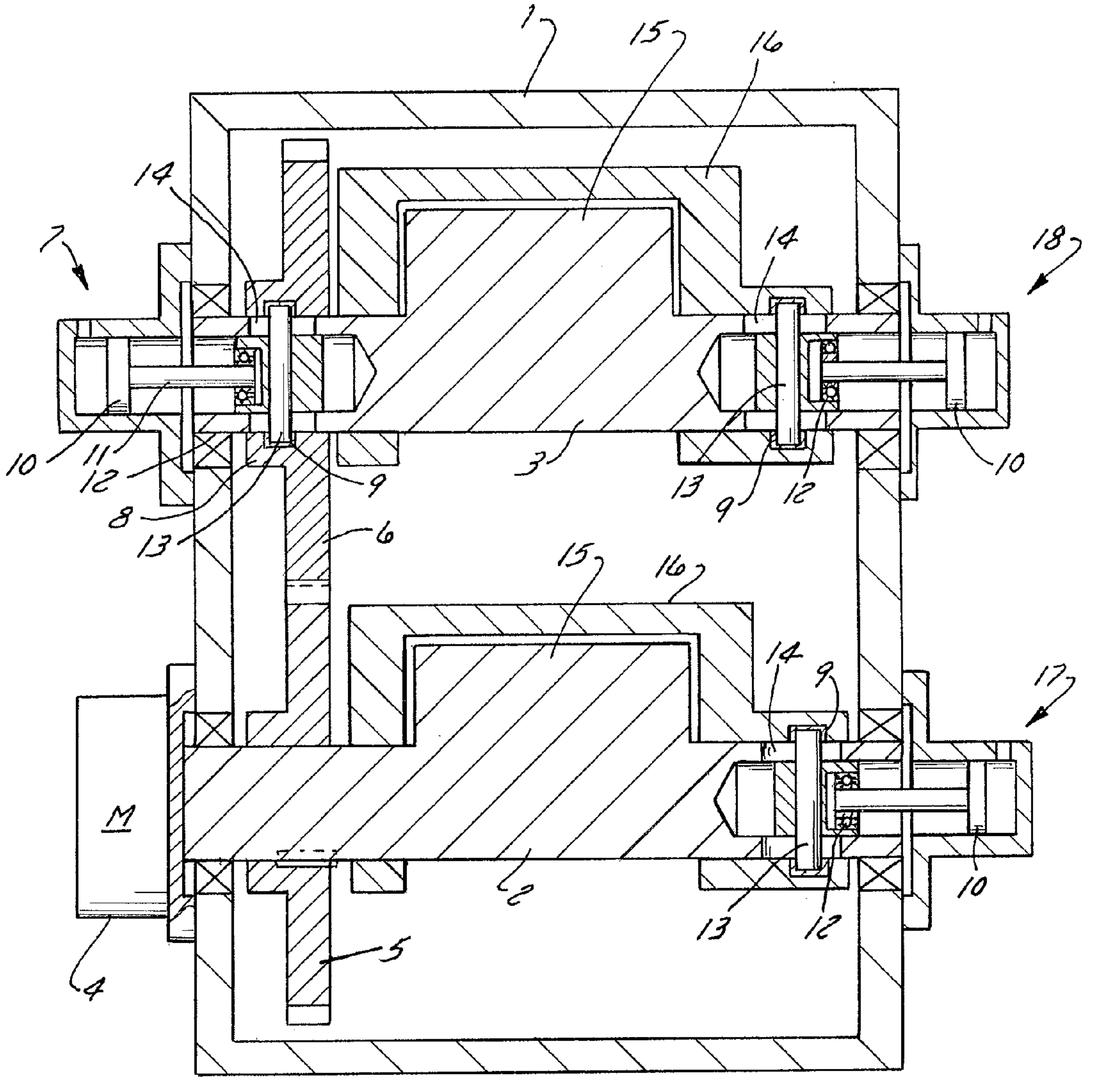
FIG. 1 shows a schematic section in the plan view of a vibration generator in accordance with the invention according to a first embodiment.

FIG. 1 shows a first embodiment of the invention in a plan view.

A first unbalanced shaft 2 and a second unbalanced shaft 3 are rotatably mounted in an generator housing 1. The first unbalanced shaft 2 is rotatably driven by a motor 4, for example an electric or hydraulic motor. The rotational movement of the first unbalanced shaft 2 is transmitted in a form-locking manner by way of mutually meshing toothed wheels 5, 6 to the second unbalanced shaft 3 which as a result rotates in the opposite direction with respect to the first unbalanced shaft 2.

A phase changing device 7 is provided on the second unbalanced shaft 3 in the flow of force of the form-locking arrangement between the first unbalanced shaft 2 and the second unbalanced shaft 3, which phase changing device renders it possible to change the relative phase position between the first and the second unbalanced shaft 2, 3.

A component of the phase changing device 7 is a hub 8 which is formed on the toothed wheel 6 and comprises on its inner side one, preferably two, screw-like groove(s) 9 which extend in a substantially inclined manner.

The phase changing device 7 is also associated with a piston 10 which can be actuated axially in a hydraulic manner and which can likewise move a guide element 12 in an axial direction by way of a piston rod 11. The guide element 12 supports a pin 13 which extends perpendicular to the rotational axis of the second unbalanced shaft 3. In the region of the pin 13 the second unbalanced shaft 3 is formed as a hollow shaft and is provided with opposite-lying, mutually parallel slots 14 which extend in parallel with the direction of the axis and which penetrate the wall of the shaft. The length of the slots 14 corresponds substantially to the axial extension of the screw-like groove 9 in the toothed wheel 6. The pin 13 penetrates the slots 14 and extends as far as into the groove 9, or possibly into two opposite grooves 9.

The piston 10 is hydraulically controlled by the operator or by a corresponding control device. As an alternative thereto, it is also possible to control the piston 10 by means of a pneumatic control, an electric motor or an electromagnet control.

Whereas the piston 10 comprising the piston rod 11 is non-rotatably connected to the generator housing 1, the guide element 12 and the pin 13 rotate with the second unbalanced shaft 3. Accordingly, a roller or slide bearing is provided for the purpose of uncoupling the movements.

When the piston 10 is axially displaced with the piston rod 11 and the guide element 12, the pin 13 also moves in an axial manner. It is not possible for the pin 13 to rotate relatively with respect to the second unbalanced shaft 3 as it is guided in the slots 14. Owing to the screw-like progression of the grooves 9 in the toothed wheel 6 the toothed wheel 6, which cannot be displaced in an axial manner, rotates relatively with respect to the second unbalanced shaft 3. However, as the toothed wheel 6 is coupled directly in a form-locking manner by way of the toothed wheel 5 to the first unbalanced shaft 2, the phase position between the two unbalanced shafts 2, 3 is consequently changed. This principle is known from EP 0 358 744 B1 and therefore does not require any further explanation.

Each of the unbalanced shafts 2, 3 supports a main unbalanced mass 15 illustrated only schematically in FIG. 1 and a part unbalanced mass 16 which can rotate on the respective unbalanced shaft 2, 3 relatively with respect to the main unbalanced mass 15 and which engages in the form of a half-shell over the main unbalanced mass 15.

The rotation of the part unbalanced masses 16 on the associated unbalanced shafts 2, 3 and thus a change in the phase positions between the main unbalanced masses 15 and the associated part unbalanced masses 16 is achieved on the first unbalanced shaft 2 by means of a first adjusting device 17 and on the second unbalanced shaft 3 by means of a second adjusting device 18. The part unbalanced masses 16 are held on the unbalanced shafts 2, 3 by means of slide bearings.

The adjusting devices 17, 18 function according to the same principle as the phase changing device 7, so that reference is made to the description thereof already provided and for the purpose of simplification the same designation numerals are used. By controlling the piston 10 of the first adjusting device 17 or the second adjusting device 18 respectively the associated part unbalanced mass 16 can be rotated relatively with respect to the associated main unbalanced mass 15 in a range of up to 180°.

FIG. 1 illustrates a case where the part unbalanced masses 16 are held by means of the adjusting devices 17, 18 in a position in which they are located with respect to the axes of rotation of the unbalanced shafts 2, 3 on the same side as the main unbalanced masses 15. Accordingly, the centrifugal forces are summated to form a resulting great total force which can lead to a strong vibration movement and thus compacting power of a ground-compacting machine using the vibration generator.

When the two adjusting devices 17, 18 are actuated simultaneously it can be achieved that the part unbalanced masses 16 are pivoted to a side of the unbalanced shafts 2, 3 lying opposite the main unbalanced mass 15, so that their centrifugal forces are directed in the opposite direction to the centrifugal forces of the main unbalanced masses 15. Accordingly, the resulting total force is low, which can be expedient for example towards the end of a compacting procedure or also for the purpose of protecting a ground which has already been compacted.

Figure 2:
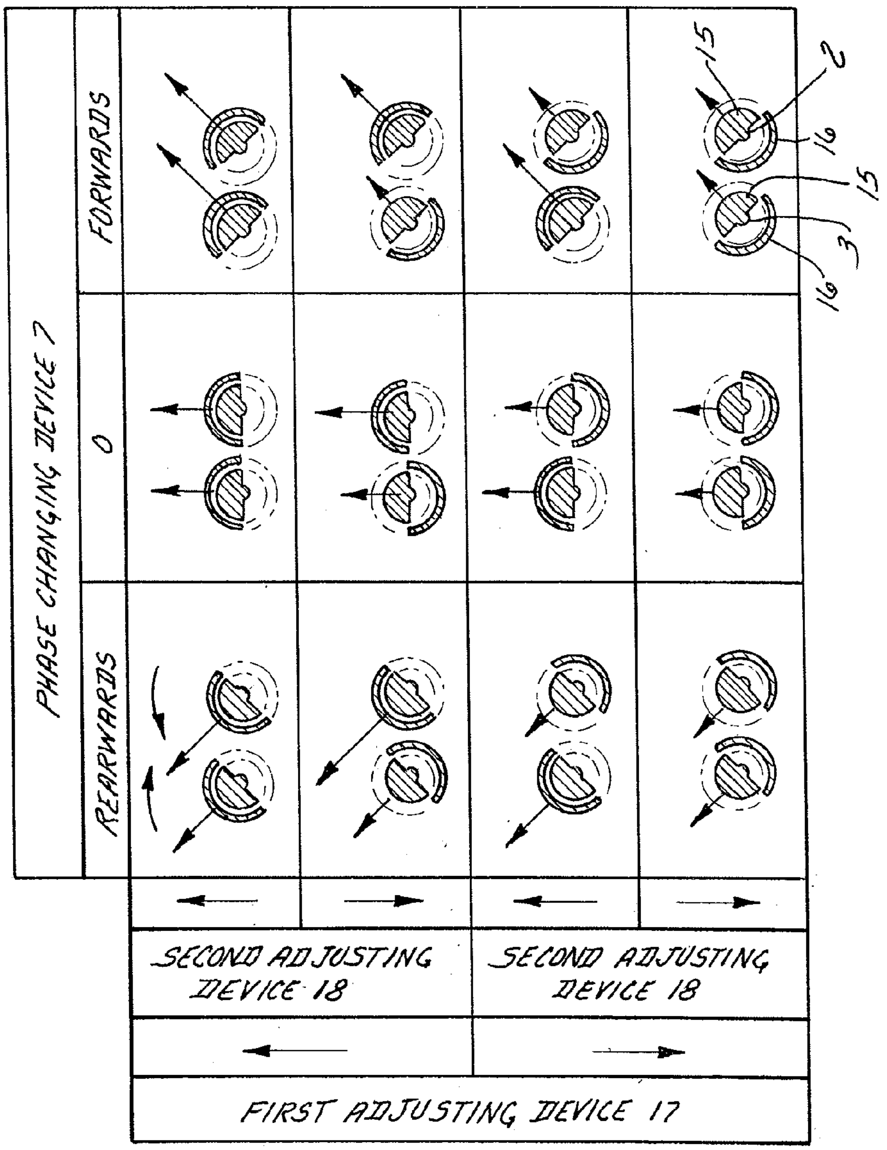
FIG. 2 shows a diagram for explaining different relative positions of unbalanced shafts and unbalanced masses in the case of the first embodiment of the invention.

FIG. 2 illustrates a diagram with different relative positions of the unbalanced shafts 2, 3 which are, above all, relevant in practice and the respective associated main unbalanced masses 15 and part unbalanced masses 16. FIG. 2 also illustrates in each case only end or maximum positions of the phase changing device 7 or the adjusting devices 17,18. Naturally, an almost infinite number of intermediate positions are possible. The schematically illustrated unbalanced shafts 2, 3 are illustrated in the form of a perpendicular section of FIG. 1.

It is to be noted that the unbalanced shafts 2, 3 rotate in opposite directions and accordingly only instantaneous recordings can be illustrated. A large arrow represents a resulting great total force with unbalanced masses 15, 16 lying on the same side, whereas a small arrow represents a resulting small force with opposite-lying unbalanced masses 15, 16.

Depending upon the adjustment of the phase changing device 7 the direction of the resulting total force generated by the vibration generator can be changed, so that as desired a direction of vibration can be set in the rearwards or forwards direction as well as a vertical direction of vibration. Vibration in the vertical direction does not generate any horizontal force component which could possibly move a vibration plate in the corresponding direction.

When using the vibration generator in a vibration plate the phase changing device 7 for the forwards and rearwards movement of the vibration plate is actuated. The resulting force vector from the two unbalanced shafts is adjusted accordingly in its direction.

In the case of a synchronised, i.e. identical direction, actuation of the adjusting devices 17, 18 and with suitable pitch directions of the grooves 9 the mr-value is set by means of the relative pivot of the part unbalanced masses 16, without the phase position of the resulting force vector changing. In the case of a one-sided or uneven, non-synchronised actuation of the adjusting devices 17, 18, the mr value of the individual unbalanced shafts 2, 3 changes. A change in the phase position of the resulting total centrifugal force vector in size and direction likewise occurs as a consequence, which offers a large range of possible adjustments.

Figure 3:
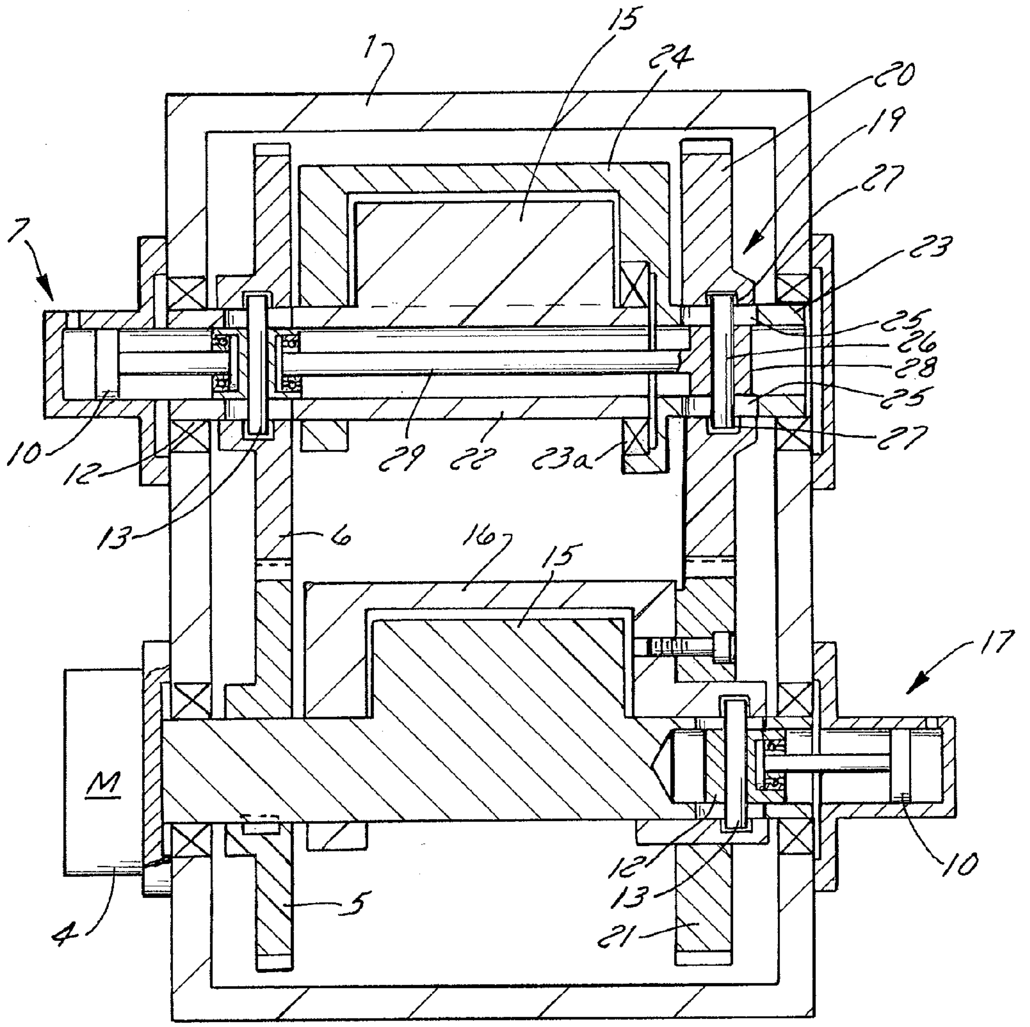
FIG. 3 shows a schematic sectional view in the plan view of a vibration generator according to a second embodiment of the invention.

FIG. 3 illustrates a second embodiment of the invention in a schematic section in plan view.

For the purpose of simplification only the differences between the second embodiment and the above described first embodiment are explained hereinunder so that components which remain unchanged with respect to the first embodiment are designated with like numerals.

The essential difference with respect to the first embodiment resides in the design of the second adjusting device (now designation number 19). Whereas the second adjusting device 18 of the first embodiment can be individually controlled and likewise supplied with energy from an external source by means of hydraulic power supplied from an external source, as is the first adjusting device 17, the second adjusting device 19 of the second embodiment does not have a separate energy supply from an external source and also cannot be controlled individually. Furthermore, the adjusting device 19 is no longer used to adjust the phase between the part and the main unbalanced mass 15, 24 but rather to adjust the phase position between the part unbalanced mass 16 of the first shaft and the part unbalanced mass 24 of the second shaft.

This is achieved by virtue of the fact that the second adjusting device 19 comprises a toothed wheel 20 which meshes with a toothed wheel 21 attached to the part unbalanced mass 16 of the first unbalanced shaft 2.

In contrast to the first embodiment, a second unbalanced shaft 22 is not fully mounted in the generator housing 1. On the contrary, one end side of the said second unbalanced shaft adjoins a freely rotatably part shaft 23, wherein the second unbalanced shaft 22 and the part shaft 23 are connected by means of a roller bearing **23*a* and form one unit which for its part is mounted in the generator housing 1**.

A part unbalanced mass 24 which can rotate about the second unbalanced shaft 22 is fixedly connected to the part shaft 23. Moreover, the part unbalanced mass 24 surrounds the main unbalanced mass 15 in the same manner as is the case in the first embodiment.

The part shaft 23 is formed as a hollow shaft and comprises two slots 25 which lie in parallel opposite each other, extending in parallel with the direction of the axis. The slots 25 are penetrated perpendicular to the direction of the axis by a pin 26 which engages in screw-like grooves 27 which are formed in the hub of the toothed wheel 20. The grooves 27 extend on the inner side of the hub of the toothed wheel 20 with an axial extension which corresponds to the axial length of the slots 25.

The pin 26 is held by a guide element 28 which is connected by means of a piston rod 29 to the guide element 12 of the phase changing device 7 in a manner which can be uncoupled by rotation but which is nonetheless form-locking.

The toothed wheels 20, 21 and the toothed wheels 5, 6 have an identical diameter.

The mode of function of the second embodiment is explained hereinunder.

Upon actuating the first adjusting device 17 for the purpose of changing the phase position of the part unbalanced mass 16 on the first unbalanced shaft 2 the corresponding pivot movement is transmitted by way of the toothed wheel 21, the toothed wheel 20, the grooves 27 and the slot 25 to the part shaft 23 and thus finally to the part unbalanced mass 24 of the second unbalanced shaft 22. The part unbalanced mass 24 is thus pivoted in a similar manner to the part unbalanced mass 16 of the first unbalanced shaft 2. It is thus not necessary to synchronise the movements. However, it is consequently also not possible to adjust individually the phase position of the part unbalanced mass 24 on the second unbalanced shaft 22.

Upon changing the phase position between the first unbalanced shaft 2 and the second unbalanced shaft 22 by actuating the phase changing device 7 the piston 10 is displaced axially which causes a corresponding axial displacement of the pins 13 and 26. Accordingly—as already explained in connection with the first embodiment—the associated toothed wheels 6 and 20 are pivoted relatively with respect to the second unbalanced shaft 22 or the associated part shaft 23 so that overall the phase position with respect to the first unbalanced shaft 2 changes.

Figure 4:
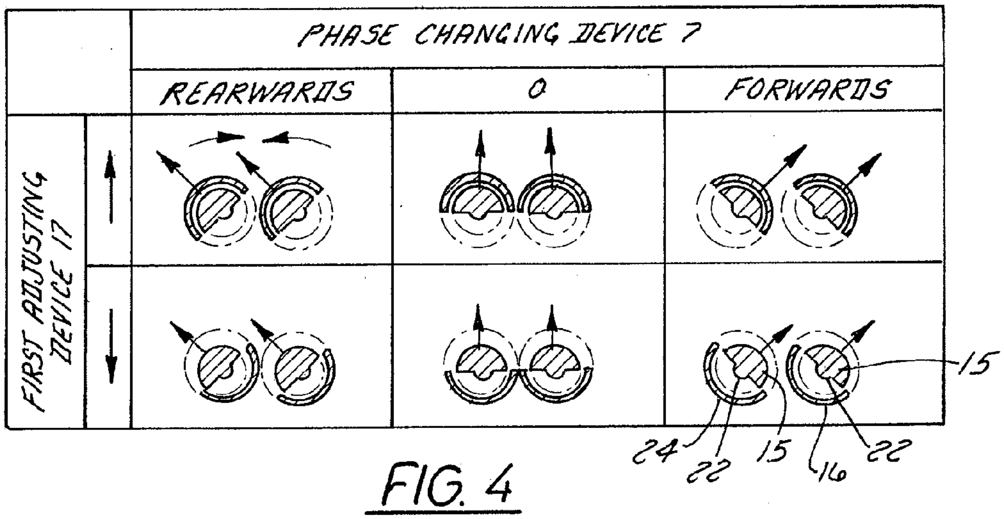
FIG. 4 shows a diagram for explaining the relative positions of unbalanced shafts and unbalanced masses in the case of the second embodiment of the invention.

Different possible adjustments in the case of the second embodiment are illustrated schematically in FIG. 4. Also in this case a large arrow means that the main and the part unbalanced mass are located on the same side and thus generate a resulting large vibration amplitude, whereas a small arrow corresponds to an opposite-lying arrangement of the unbalanced masses and thus to a resulting low vibration amplitude.

An actuation of the first adjusting device 17 in the case of the second embodiment causes the same change of the mr-value for the two unbalanced shafts 2, 22, without the phase position of the resulting force vector being changed.

The adjusting devices 17, 18, 19 and the phase changing device 7 can be controlled in a mechanical, hydraulic or electric manner. It is readily possible to use upstream corresponding control algorithms which render it easier to operate the vibration generator. In this case it is expedient to provide in addition an angle of rotation sensor, a position sensor, position or path sensors, an acceleration recorder etc. for the purpose of determining the respective characteristic variables.

In the case of further embodiments not illustrated in the figures it is possible to change the arrangement of the components and the manner in which components cooperate without deviating from the basic principle of the invention. Thus, for example in the case of the first embodiment according to FIG. 1 it is possible to exchange the phase changing device 7 and the motor 4 in the arrangement so that the motor 4 drives the second unbalanced shaft 3.

We claim:

1. A vibration generator comprising:

a first unbalanced shaft and a second unbalanced shaft which is axially parallel to the first unbalanced shaft and which is coupled thereto by a form-locking coupling such that the first and second unbalanced shafts can rotate in opposite directions, one of the unbalanced shafts being driven to rotate; and a phase changing device which is integrated in the form-locking coupling between the first and second unbalanced shafts for the purpose of adjusting a relative phase position of the first and second unbalanced shafts; wherein each of the first and second unbalanced shafts bears a main unbalanced mass and a part unbalanced mass which moves with respect to the main unbalanced mass;

a first adjusting device is provided for actively adjusting phase position between the main unbalanced mass and the part unbalanced mass on the first unbalanced shaft; wherein a second adjusting device is provided for actively adjusting a phase position between the main unbalanced mass and the part unbalanced mass of the second unbalanced shaft;

the first adjusting device and the phase changing device are supplied with energy from an external source and are each controlled by a separate control, and the second adjusting device is coupled to one of the phase changing device and to a combination of the first adjusting device and the phase changing device in such a manner that it is controlled exclusively by way of the effect of the phase changing device or the combination of first adjusting device and the phase changing device; wherein the second unbalanced shaft and the main unbalanced mass on the second unbalanced shaft are fixedly connected to each other; and wherein the second adjusting device is coupled to the phase changing device in a form-locking manner such that an adjustment, caused by the phase changing device, of the phase position of the first unbalanced shaft causes a similar adjustment of the phase position of the part unbalanced mass on the second unbalanced shaft.

* * * * *